(12) United States Patent
Ichiyama

(10) Patent No.: US 6,404,087 B1
(45) Date of Patent: Jun. 11, 2002

(54) MOTOR INCLUDING HYDRODYNAMIC BEARINGS WITH PAIR OF THRUST PLATES

(75) Inventor: Yoshikazu Ichiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 09/672,506

(22) Filed: Sep. 29, 2000

(30) Foreign Application Priority Data

Oct. 1, 1999 (JP) ............................................ 11-281231

(51) Int. Cl.[7] .............................. H02K 5/16; H02K 7/09; F16C 32/06; F16C 33/74
(52) U.S. Cl. ..................... 310/90; 310/90.5; 384/107; 384/119; 384/132; 384/135
(58) Field of Search ..................... 310/90, 261, 90.5, 310/42; 384/100, 107, 111, 112, 113, 118, 119, 120, 123, 124, 132; 360/271.3, 271.2

(56) References Cited

U.S. PATENT DOCUMENTS

| | | | | |
|---|---|---|---|---|
| 4,694,213 A | * | 9/1987 | Gowda et al. ................ | 310/90 |
| 5,112,142 A | | 5/1992 | Titcomb et al. ............. | 384/107 |
| 5,323,076 A | * | 6/1994 | Hajec .......................... | 310/90 |
| 5,448,120 A | * | 9/1995 | Schaule et al. ............... | 310/90 |
| 5,558,445 A | | 9/1996 | Chen et al. .................. | 384/132 |
| 5,806,987 A | * | 9/1998 | Nose et al. .................. | 384/107 |
| 5,941,644 A | | 8/1999 | Takahashi .................... | 384/112 |
| 6,059,459 A | * | 5/2000 | Ichiyama ..................... | 384/112 |
| 6,296,391 B1 | * | 10/2001 | Hayakama et al. .......... | 384/119 |

* cited by examiner

Primary Examiner—Tran Nguyen
(74) Attorney, Agent, or Firm—James Judge

(57) ABSTRACT

Disk-drive motor having two hydrodynamnic bearing sections separated with respect to the shaft by an air intervention, each composed of a radial and a thrust dynamic-pressure bearing portion, and in each of which lubricant is retained continuously throughout the radial and thrust bearing portions At least one communicating pathway is formed in the sleeve, axially communicating the thrust faces that are constituents of, and retaining lubricant continuously with, the pair of thrust bearing portions. Via the communicating pathway, the lubricant retained in the two hydrodynamic bearing sections shifts mutually from the one section to the other, such that the radii of curvature of the meniscuses forming the respective boundaries arc equalized. The amount of lubricant held in the bearing sections is accordingly equalized and lubricant leaking out of the radial bearing portions is taken up and re-circulated.

8 Claims, 2 Drawing Sheets

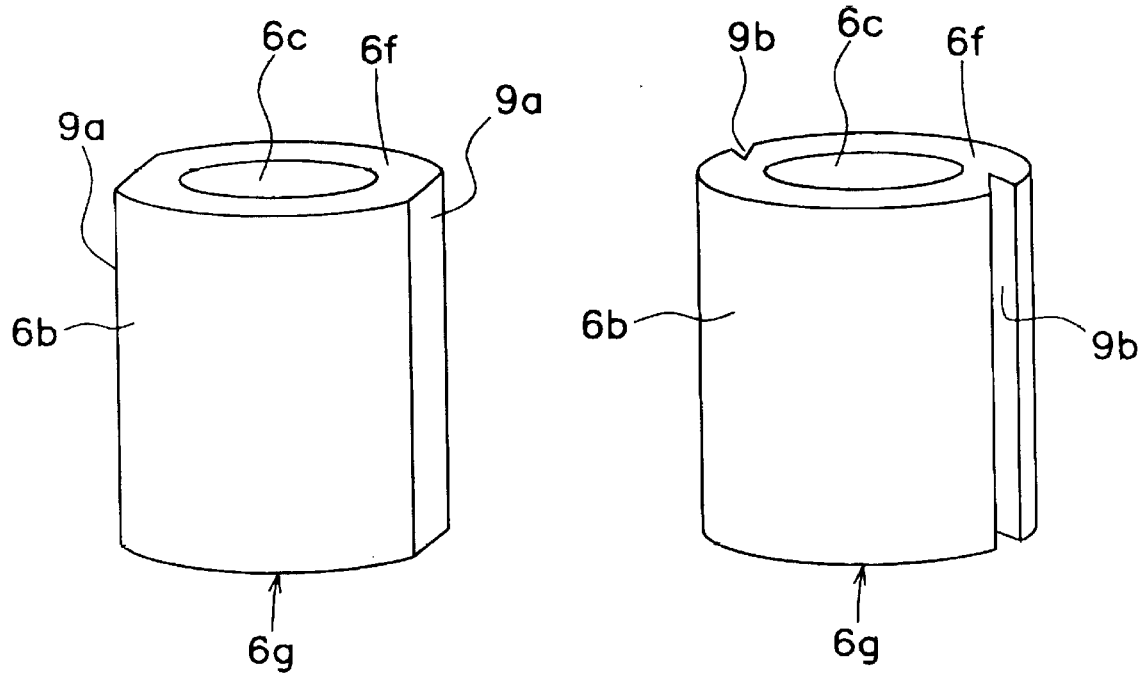
*Fig. 2A*     *Fig. 2B*

MOTOR INCLUDING HYDRODYNAMIC BEARINGS WITH PAIR OF THRUST PLATES

BACKGROUND OF THE INVENTION

1. Technical Field

The present invention relates to motors for driving storage disks and, in particular, pertains to a motor provided with hydrodynamic bearings in which distribution of lubricating oil for the bearings is regulated.

2. Description of Related Art

It is known to furnish motors with hydrodynamic bearing mechanisms for rotatably supporting the rotor in the motor. Such hydrodynamic bearing mechanisms include a pair of thrust dynamic-pressure bearings and a pair of radial dynamic-pressure bearings. A pair of thrust plates along with a sleeve in the motor composes the thrust dynamic bearings. Lubricating oil is retained in the thrust dynamic bearings in a gap between the axially inward surface of each thrust plate and each of axially outward surfaces of the sleeve adjacent to the thrust plate inward surfaces. Striations for generating dynamic pressure in the lubricating oil are formed on either the axially inward surfaces of the thrust plates, the outward surfaces of the sleeve, or both. The substantially cylindrical inner surface of the sleeve surrounds the motor shaft to form a gap between the sleeve and the outer circumferential surface of the shaft radially opposing the sleeve inner surface. Lubricating oil is retained in the gap, and striations for generating dynamic pressure in the lubricating oil are formed on either of the opposing sleeve inner and shaft outer surfaces, or both, to compose the radial dynamic bearings.

Japanese Laid-open patent application No. 09-217735 discloses a motor furnished with a conventional hydrodynamic bearing mechanist including a pair of upper and lower thrust dynamic-pressure bearings, and a pair of upper and lower radial dynamic-pressure bearings. Thrust plates secured on either end of the motor shaft form a pair whose axially inward surfaces together with respectively adjacent axially outward surfaces of the sleeve in the motor form the pair of upper and lower thrust dynamic bearings. The pair of upper and lower radial dynamic bearings is formed by portions of the shaft outer circumferential surface and the sleeve inner circumferential surface, respectively adjacent the upper and lower thrust bearings. The radial bearings are axially separated by an air-filled space for letting air bubbles generated in the lubricant go out of the bearing mechanism. Thus this conventional hydrodynamic bearing mechanism has an upper bearing section, composed of the upper thrust and the upper radial dynamic-pressure bearings, and a lower bearing section, composed of the lower thrust and the lower radial dynamic-pressure bearings. The upper bearing section retains lubricating oil that is continuous throughout the upper thrust and radial dynamic-pressure bearings. Likewise, the lower bearing section retains lubricating oil that is continuous throughout the lower thrust and radial dynamic-pressure bearings. Accordingly, once the motor has been assembled the lubricating oil retained in the upper bearing section is completely separated by the air-filled space from the lubricating oil retained in the lower bearing section.

In the foregoing conventional motor having the conventional hydrodynamic pressure bearing mechanism, the particular configuration of the dynamic-pressure-generating striations in the thrust and radial bearings, together with taper seals formed adjacent the upper and lower bearing sections, prevents the lubricating oil from leaking outside the bearings. The upper and lower thrust bearing gaps taper radially inward to form the taper seals. The striations for the thrust dynamic-pressure bearings are configured as spiral grooves in a formation to urge the lubricating oil radially inward. The striations for the radial dynamic-pressure bearings are configured as herringbone grooves in an axially asymmetrical formation to urge the lubricating oil axially outward from the radial bearings toward the respectively adjacent thrust bearings.

In the motor furnished with foregoing conventional hydrodynamic pressure bearing mechanism, the upper and lower taper seals serve to retain the lubricating oil within the respective upper and lower bearing sections. However, due to characteristics of the lubricating oil at its molecular level, an oil migration phenomenon occurs in which the lubricating oil tends to spread from the bearing sections to areas where the oil normally is not present: along surfaces of the thrust-bearing thrust plates and of the rotor, and along surfaces of the shaft and sleeve in the radial bearings.

The conditions of the foregoing oil migration phenomenon change depending on the material, surface smoothness and like factors of the members in contact with the lubricating oil, such that the lubricating oil disperses by different amounts in different dynamic pressure bearings. Accordingly, when lubricating oil is retained in amounts completely separated from each other in the upper and in the lower bearing sections once the motor has been assembled—as in the case of the foregoing conventional motor—a difference, and therefore an imbalance, occurs between the upper and lower amounts of lubricating oil retained. In addition, wherein the motor assumes its normal or upright posture with its base plate underneath, gravity acting on the lubricating oil in the upper bearing section accelerates the oil migration phenomenon, which increases leakage and dispersion of the lubricating oil.

Moreover, while the motor is rotating, the lubricating oil retained in the upper dynamic bearing section is displaced toward the upper thrust dynamic-pressure bearing under centrifugal force, and by a pumping action created by the axially asymmetric herringbone grooves of the upper radial dynamic-pressure bearing. Consequently, the lower boundary surface of the lubricating oil in the upper radial dynamic-pressure bearing is displaced upward, which exposes the lower ends of the herringbone grooves formed on the shaft or sleeve to the air in the air-filled space. Thus the border of the lubricating oil boundary surface comes to lie on the herringbone grooves, such that the border rises and falls along the corrugated contour of the grooves, which sets up vibrations during rotation of the motor. Motor vibrations thus caused, as well as external vibrations or impact on the motor, dislodge lubricating oil retained in the upper radial dynamic-pressure bearing, such that it drips down into the lower radial dynamic-pressure bearing. This increases the difference in the amount of lubricating oil retained in the upper and lower bearing sections.

When an imbalance occurs between the amount of lubricating oil retained in the upper and lower bearing sections, the dynamic-pressure-generating striations in the bearing that retains the lesser amount of lubricating oil are partially exposed to air, reducing the dynamic pressure produced therein. Consequently bearing rigidity between the upper and lower bearing sections differs, which tends to destabilize the motor rotation. Further, durability and reliability of the motor are impaired by early depletion of lubricating oil from the bearings due to such causes as oil migration leakage.

In the conventional motor, it has in fact been impossible to redistribute the lubricating oil between the upper and lower bearing sections to equalize the retained amounts when there is a difference between the upper and lower sections, since the pair of radial bearings is completely separated by the air-filled space.

Also to be noted is that the above-described imbalance occurs in the amounts of lubricating oil retained in the upper and lower dynamic-pressure bearing sections due to errors in the operation of injecting lubricating oil into the bearing sections.

SUMMARY OF THE INVENTION

An object of the present invention is to increase the usable life span of hydrodynamic-bearing-equipped disk-drive motors.

Another object is to improve the reliability and endurance of such disk-drive motors.

A still further object of the invention is, in disk-drive motors equipped with hydrodynamic bearings having bearing sections separated by an air intervention, to equalize the amount of lubricant held in the bearing sections and to take up and re-circulate again to the bearing sections lubricant leaking out of the radial dynamic-pressure bearing portions, in order to maximize rotation stability toward increasing usable life span.

A motor of the present invention is furnished with two hydrodynamic bearing sections separated with respect to the shaft by an air intervention, each composed of a radial and a thrust dynamic-pressure bearing portion, and in each of which lubricant is retained continuously throughout the radial and thrust bearing portions.

The boundaries of the lubricant retained in the two bearing sections front on air. The lubricant boundaries are meniscuses formed by the balancing of the energy of the lubricant itself (the surface tension and intermolecular forces of the lubricant) and of external energy (air pressure of the air contacting the lubricant boundaries and the surface energy of the motor bearing components).

At least one communicating pathway is formed in the sleeve, axially communicating the thrust faces that are constituents of the thrust dynamic-pressure bearing portions of the two bearing sections, the communicating pathway retains lubricant continuously with the pair of thrust bearing portions.

Via the communicating pathway, the lubricant retained in the two hydrodynamic bearing sections shifts mutually from the one section to the other, such that the radii of curvature of the meniscuses forming the respective boundaries are equalized.

A quantitative imbalance occurring between the amounts of lubricant retained in the two bearing sections, for example, when lubricant dislodged from one of the radial dynamic-pressure bearing portions is displaced to the other, means that a discrepancy in the radii of curvature of the meniscuses will arise. When this happens, a discrepancy by the pressure difference between energy of the lubricant itself and the external energy occurs in the lubricant retained in the two bearing sections The discrepancy from the pressure difference sets up an imbalance in the internal pressure of the lubricant retained in the two bearing sections. Due to this internal pressure imbalance, however, a pressure shift occurs via the communicating pathway from that bearing section in which the amount of lubricant retained is greater to that in which the amount is lesser. Consequently, redistribution that equalizes the retained amounts of lubricant in the two hydrodynamic bearing sections takes place through the communicating pathway, eliminating the quantitative imbalance in the lubricant retained in the two bearing sections.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIG. 2A is an oblique view of an instance in which communicating pathways are made by cutting off sections of the outer periphery of the sleeve to form planes, and FIG. 2B is an oblique view of an instance in which communicating pathways are made by forming V-shaped grooves in sections of the outer periphery of the sleeve.

DETAILED DESCRIPTION OF THE PREFERRED EMBODIMENTS

Figure 1:
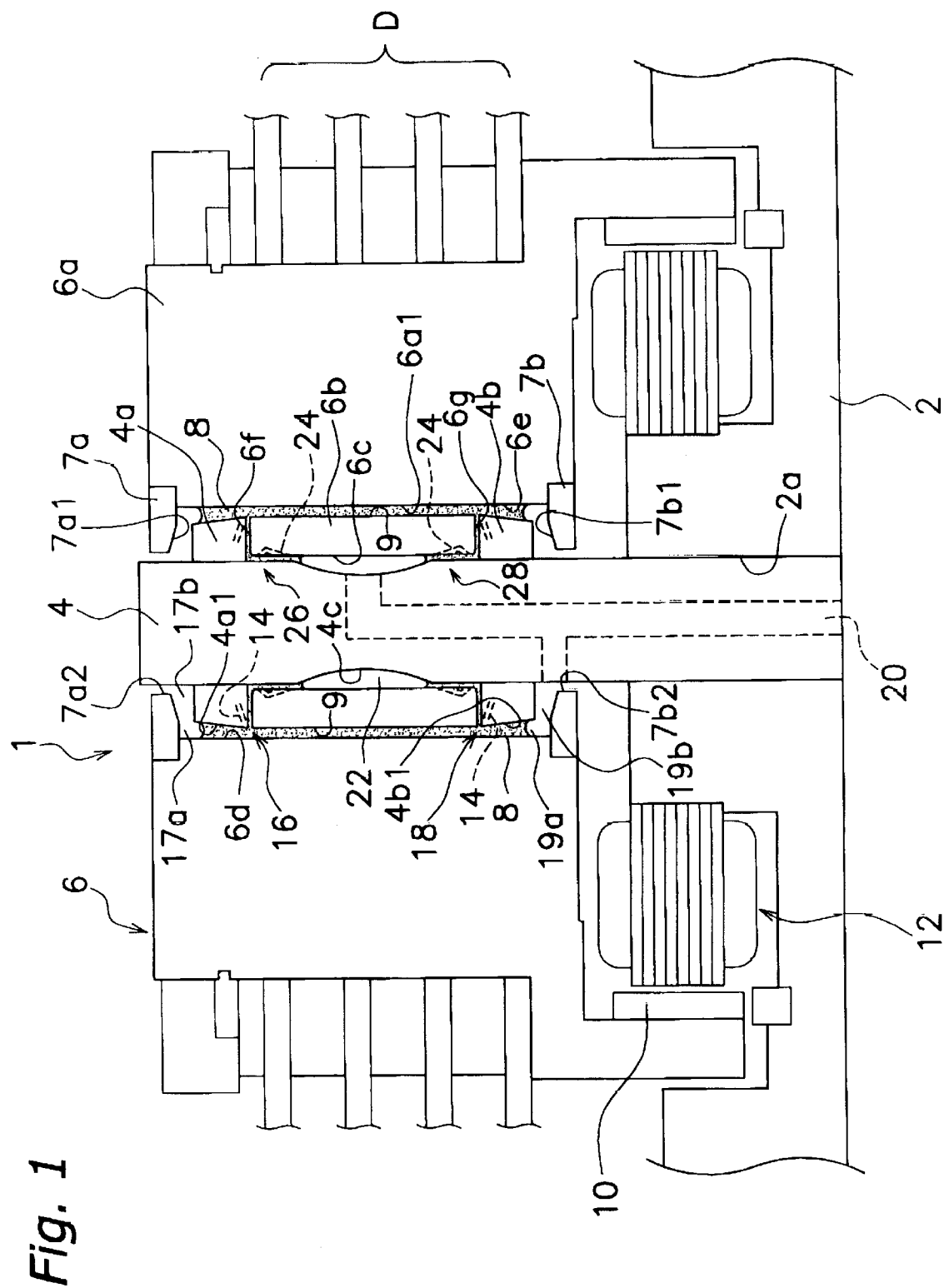
FIG. 1 is a sectional view typifying an outline configuration of a motor of the present invention.

The storage-disk drive motor 1 depicted in FIG. 1 is furnished with a bracket 2, a shaft 4 the exterior of one end of which is fixedly fitted into a central opening 2a in the bracket 2, and a rotor 6 rotative relative to the shaft 4. The rotor 6 is furnished with a rotor hub 6a on the outer periphery of which storage disks D are loaded, and a sleeve 6b fitted to the inner circumferential surface of a central hole 6a1 that is a round bore formed through the rotor hub 6a. Further, rotor magnets 10 are fastened to the inner periphery of the rotor hub 6a by adhesive means, and a stator 12 is fitted to the bracket 2, radially opposing the rotor magnets 10.

A bore 6c is formed in the approximate center of the sleeve 6b. The inner circumferential surface of the bore 6c axially extending through the sleeve 6b therein is at an interval from the outer circumferential surface of the shaft 4 to form a micro-gapin which lubricant 8 is retained. Radially outwardly projecting disk-shaped upper thrust plate 4a and lower thrust plate 4b are mounted respectively to the upper portion and the lower portion of the shaft 4.

It should be understood that "upper" and "lower" herein are relative terms used for the sake of clarity in reference to the drawings, and are not meant to imply that the motor described is functional only in the illustrated orientation. Further, "axially inward" herein means "heading from either end (of the shaft or sleeve, for example) axially toward the lengthwise middle," while "axially outward" means "heading from the lengthwise middle axially toward either end (of the shaft or sleeve, for example)."

The inner circumferential surface of the central hole 6a1, and upper and lower thrust faces 6f and 6g that are either axial end face of the sleeve, define upper and lower openings 6d and 6e in regions of the central hole 6a1 that correspond to the upper and lower thrust plates 4a and 4b. The upper and lower openings 6d and 6e are diametrically larger than the outer diameter of the thrust plates 4a and 4b, and are blocked off by ring-shaped upper and lower counter-plates 7a and 7b. Apertures 7a2, 7b2, centrally through which the shaft 4 pierces, are formed in the respective upper and lower counter-plates 7a and 7b.

An upper thrust dynamic-pressure bearing portion 16 is configured by an upper micro-gap in which lubricant 8 is retained, and by an upper set of spiral grooves 14. The upper micro-gap is formed in between the upper thrust face 6f of the sleeve 6b and the lower face (axially inward face) of the upper thrust plate 4a, and extends from the inner periphery of the bore 6c to the outer periphery of the upper opening 6d. The upper spiral grooves 14 are formed in rows on the lower face of the upper thrust plate 4a for generating dynamic pressure in the lubricant 8 attending rotation of the rotor 6.

In turn, a lower thrust dynamic-pressure bearing portion 18 is configured by a lower micro-gap in which lubricant 8 is retained, and by a lower set of spiral grooves 14. The lower micro-gap is formed in between the lower thrust face 6g of the sleeve 6b, and the lower face (axially inward face) of the upper thrust plate 4b, and extends from the inner periphery of the bore 6c to the outer periphery of the lower opening 6e. The lower spiral grooves 14 are formed in rows on the upper face of the lower thrust plate 4b for generating dynamic pressure in the lubricant 8 attending rotation of the rotor 6.

The spiral grooves 14 formed in the upper and lower thrust dynamic-pressure bearing portions 16, 18 develop a pumping action in the lubricant 8 that pressure-sends it heading radially inward.

The outer circumferential surface 4a1 of the upper thrust plate 4a is formed into a taper such that heading axially outward, the gap between it and the radially opposing inner circumferential surface of the upper opening 6d of the rotor 6 expands. When the motor 1 is at a standstill, a meniscus (interface between the lubricant 8 and the outer air) is formed in lubricant 8 retained in the upper thrust-bearing portion 16, within this tapered gap between the surface 4a1 and the inner circumferential surface of the upper opening 6d. The energy of the lubricant 8 itself (surface tension of and intermolecular forces in the lubricant 8) and external energy (atmospheric pressure of air contacting the lubricant boundary surface and surface energy of the motor 1 components the lubricant contacts) balance to form this meniscus. Accordingly, the gap defined between the outer circumferential surface 4a1 of the upper thrust plate 4a and the inner circumferential surface of the upper opening 6d in the rotor 6 functions as an upper first tapered seal 17a.

Likewise, the outer circumferential surface 4b1 of the lower thrust plate 4b is formed into a taper such that heading axially outward, the gap in between it and the radially opposing inner circumferential surface of the lower opening 6e of the rotor 6 expands. When the motor 1 is at a standstill, a meniscus is formed in lubricant 8 retained in a the lower thrust dynamic-pressure bearing portion 18, within the tapered gap between the surface 4b1 and the inner circumferential surface of the lower opening 6e in the rotor 6. Accordingly, the gap defined in between the outer circumferential surface 4b1 of the lower thrust plate 4b and the inner circumferential surface of the lower opening 6e in the rotor 6 functions as a lower first tapered seal 19a.

The lubricant 8 held in the upper and lower thrust dynamic-pressure bearing portions 16, 18 forms meniscuses and is retained in the upper and lower first tapered seals 17a, 19a. Therein, even if the action of centrifugal force during motor 1 rotation presses and shifts lubricant 8 radially outward, the lubricant is blocked from travelling further by the inner circumferential surfaces of the upper opening 6d and the lower opening 6e. Further, lubricant 8 that due to the oil migration phenomenon has diffused onto the surfaces of the upper and lower thrust plates 4a, 4b and of the rotor 6 is pressure-sent radially outward under the action of centrifugal force, and re-circulated to lubricant 8 retained in the upper and lower first tapered seals 17a, 19a, preventing leakage of the lubricant 8 to the exterior of the motor 1.

The bottom face 7a1 of the upper counter-plate 7a as it heads radially inward forms a taper in which the axial gap at the interval with the upper face (axially outward face) of the upper thrust plate 4a expands, by which an upper second tapered seal 17b is formed. The upper second tapered seal 17b through the gap between the aperture 7a2 and the outer circumferential surface of the shaft 4 is communicated open to the motor 1 external air. During rotation of the motor 1, the lubricant 8 forms a meniscus and is retained in the upper second tapered seal 17b. In turn, upper face 7b1 of the lower counter-plate 7b as it heads radially inward forms a taper in which the axial gap at the interval with the lower face (axially outward face) of the lower thrust plate 4b expands, by which a lower second tapered seal 19b is formed. Likewise, the lower second tapered seal 19b through the gap between the aperture 7b2 and the outer circumferential surface of the shaft 4 is also communicated open to the motor 1 external air. During rotation of the motor 1, the lubricant 8 forms a meniscus and is retained in the lower second tapered seal 19b.

Thus, during rotation of the motor 1, the meniscuses in the lubricant 8 head radially inward to lie within the second tapered seals 17b, 19b. Consequently, when the motor 1 rotates lubricant 8 that has dispersed due to the oil migration phenomenon is pressure-sent heading radially outward under centrifugal force acting on the lubricant 8, and is re-circulated to lubricant 8 retained in the second tapered seals 17b, 19b. This further prevents leakage to the exterior of the motor 1.

An annular recess 4c is formed in approximately the mid-portion of the outer circumferential surface of the shaft 4 with respect to the sleeve 6b. The annular recess 4c constitutes a gap expansion in which the radial dimension of the gap at the interval with the inner circumferential surface of the bore 6c expands heading from either end axially to the mid-portion of the shaft 4. Opening on the recess 4c is a through-hole 20 formed within the shaft 4, which communicates with air external to the motor 1. Air taken into the micro-gaps from this opening forms an annular gas intervention 22 in between the recess 4c and the inner circumferential surface of the bore 6c.

Upper and lower radial dynamic-pressure bearing portions 26 and 28 are configured by sets of herringbone grooves 24 formed in rows in regions on the inner circumferential surface of the bore 6c corresponding to where the lubricant 8 is retained sectioned axially above and below by air held in the recess 4c. The herringbone grooves 24 generate dynamic pressure in the lubricant 8 attending rotation of the rotor 6.

The herringbone grooves 24 formed in the upper and lower radial dynamic-pressure bearing portions 26, 28 are spiral striations joined mutually contrariwise, configured in an axially asymmetrical form in which the spiral striations located axially outward are short compared to the spiral striations located axially inward Thus pressure peaks in the dynamic pressure that develops in the herringbone grooves 24 formed in the upper and lower radial dynamic-pressure bearing portions 26, 28 appear biased axially outward. That is, the purpling action on the lubricant 8 by the herringbone grooves 24 acts heading toward the upper and lower thrust dynamic-pressure bearing portions 16, 18. Meniscuses are formed in the lubricant 8 held in the upper and lower radial dynamic-pressure bearing portions 26 and 28 respectively. The meniscuses are retained within the gap in which the gas intervention 22, defined between the recess 4c in the shaft 4 and the inner circumferential surface of the bore 6c, varies in radial dimensions.

Because the dynamic-pressure generating means formed in the thrust dynamic-pressure bearing portions 16, 18 are the spiral grooves, necessary axial load-supporting pressure is not generated by them alone. Nonetheless, the herringbone grooves 24 in the neighboring radial dynamic-pressure bearing portions 26, 28 are formed to bias axially outward (toward the thrust dynamic-pressure bearing portions 16, 18) the pressure peaks in the dynamic pressure that is generated. Through cooperation of the two bearing sections, this enables the necessary dynamic pressure for supporting loads borne by the rotor 6 to be generated. The herringbone grooves 24 are herein set to balance the dynamic pressure of the thrust dynamic-pressure bearing portions 16, 18 during rotation of the rotor 6, by shifting the lubricant 8 boundary interfaces in the vicinity of the radial dynamic-pressure bearing portions 26, 28 on the gas intervention 22 side into the radial dynamic-pressure bearing portions 26, 28. This exposes a portion of the asymmetrical herringbone grooves 24 into the air.

Again, the upper and lower radial dynamic-pressure bearing portions 26, 28 configure respectively an upper dynamic-pressure bearing section and a lower dynamic-pressure bearing section in which lubricant 8 is retained continuously with the adjacent thrust dynamic-pressure bearing portions 16, 18. In the dynamic-pressure bearing sections, from the lubricant 8 boundaries on the one hand (the meniscuses formed in the gas intervention 22) to the lubricant 8 boundaries on the other (the meniscuses formed in the first tapered seals 17a, 19a or in the second tapered seals 17b, 19b), the dynamic pressure becomes greatest at only one point during rotation of the rotor 6; no minimum point exists. This accordingly makes for a configuration that readily rids air bubbles into the air from the boundaries of the lubricant 8, where the pressure automatically becomes minimal even if they have become included in the lubricant 8.

Thus, air bubbles that have arisen in the lubricant 6 retained in the dynamic-pressure bearing sections shift successively to the low-pressure side, and are released to the air from the boundary surfaces of the lubricant 8. Therefore the air bubbles do not stay in the lubricant 8, which prevents lubricant 8 from leaking to the bearing exterior due to thermal expansion of air bubbles during temperature elevation in the motor 1.

Further communicating pathways 9 are formed on the inner circumferential surface of the sleeve 6b, positioned in between the upper and lower thrust dynamic-pressure bearing sections 16, 18, making connecting passages between the pair of thrust dynamic-pressure bearing sections 16, 18. Either ends of the communicating pathways 9 open in the vicinity of the outer peripheral ends of the thrust dynamic-pressure bearing portions 16, 18 wherein lubricant 8 continuous with the lubricant 8 retained in the thrust dynamic-pressure bearing portions 16, 18 is sustained by the capillary effect.

If a quantitative imbalance has occurred between the lubricant 8 retained in the upper dynamic-pressure bearing section and the lubricant 8 retained in the lower dynamic-pressure bearing section, separated by the gas intervention 22, the lubricant 8 meniscus in the dynamic-pressure bearing section on the side retaining the greater lubricant 8 will position to that section among the gas intervention 22 and the tapered seals 17a, 17b, 19a and 19b where the gap is more expanded. Consequently, a difference arises between the radius of curvature of the lubricant 8 meniscuses in the upper dynamic-pressure bearing section within the gas intervention 22 and the upper first tapered seal 17a or upper second tapered seal 17b, and the radius of curvature of the lubricant 8 lower dynamic-pressure bearing section meniscuses in the gas intervention 22 and the lower first tapered seal 19a or lower second tapered seal 19b.

The meniscuses on the side in which the greater lubricant 8 is retained will naturally be in sections where the gaps are larger than will be the meniscuses on the lesser lubricant 8 side. This makes the pressure difference between the external energy acting on the meniscuses in the section where the gaps are smaller—i.e., where their radius of curvature is smaller—and the energy of the lubricant 8 itself, greater than the pressure difference between the external energy acting on the meniscuses in the section where the gaps are larger—i.e., where their radius of curvature is larger—and the energy of the lubricant 8 itself. An imbalance therefore occurs in the internal pressure of the lubricant 8.

In response, a pressure shift from the bearing section side in which the retained amount of lubricant 8 is greater to the side in which it is lesser takes place until the imbalance in the internal pressure of the lubricant 8 retained in the two bearing sections is eliminated. The pressure shift makes the radii of curvature of the lubricant 8 meniscuses formed within the gas intervention 22 and the tapered seals 17a, 19a, 17b, and 19b equivalent. In other words, redistribution of the lubricant 8 through the communicating pathways 9 occurs until the lubricant 8 meniscuses among the gas intervention 22 and the tapered seals 17a, 19a, 17b, and 19b are in equivalent gap positions. This eliminates the quantitative imbalance between the lubricant 8 retained in the upper bearing section and that retained in the lower bearing section.

In particular, lubricant 8 is always retained within the communicating pathways 9 by capillary action, continues with lubricant 8 held in the thrust dynamic-pressure bearing portions 16, 18. This means that during rotation of the motor 1, in addition to the above-described external energy, centrifugal force due to the motor 1 rotation acts as a compressive force from the second tapered seals 17b, 19b toward the thrust dynamic-pressure bearing portions 16, 18. Accordingly, forming the communicating pathways 9 so as to open within the upper/lower thrust faces 6f, 6g in the vicinity of the thrust dynamic-pressure bearing portion 16, 18 outer peripheral boundaries means that a larger pressure shift is impated to the lubricant 8. As a consequence, even if, stemming from external vibrations and shocks applied to the motor 1, a considerable amount of lubricant 8 that had been retained in a bearing section on the one hand shifts to the bearing section on the other hand, lubricant 8 will be quickly redistributed to the bearing section side short of lubricant 8.

The lubricant 8 retained in the upper and lower, air-separated bearing sections is thus made mutually shiftable between then. Wherein a quantitative imbalance in the retained lubricant 8 has occurred, redistribution of lubricant 8 takes place through the communicating pathways 9, and the retained amounts of lubricant 8 held in the upper and in the lower bearing section are equalized, thereby to attain stabilized rotation of the motor 1.

The communicating pathways 9 may be configured, as is indicated in FIG. 2A, by forming planes 9a on the sleeve 6b from the upper thrust face 6f to the lower thrust face 6g. The sleeve 6b is then inserted into the central hole 6a1 that is the round bore in the rotor hub 6a, fitted therein to define air slots between the planes 9a and the inner circumferential surface of the central hole 6a1. The planes 9a are formed by shaving portions approximately 50 to 100 m in thickness dimension off the outer circumferential surface of the sleeve 6b. Alternatively, the communicating pathways 9 may be configured, as is indicated in FIG. 2B, by forming axially extending grooves 9*b* in the outer circumferential surface of the sleeve 6*b*. The grooves 9*b* are roughly V-shaped in cross-section and approximately 50 to 100 m in depth. The sleeve 6*b* is inserted into the central hole 6*a*1 to define air slots between the grooves 9*b* and the central hole 6*a*1.

It should be understood that wherein the rotor 6 is formed of a single member, the communicating pathways 9 may also be formed by bores approximately 50 to 100 m in diameter. The bores extend from the upper to the lower thrust faces 6*f*, 6*g* that are components of the thrust dynamic-pressure bearing portions 16, 18. Furthermore, in FIG. 1 and FIG. 2A, 2B an instance is illustrated in which the communicating pathways 9 are formed in two places circumferentially, but the configuration is not thus limited. A plural configuration of communicating pathways 9 evenly spaced circumferentially is possible, or the configuration may be only a single communicating pathways 9.

The radial gap between the inner circumferential surfaces of the apertures 7*a*2, 7*b*2 in the upper and lower counter-plates 7*a*, 7*b* and the outer circumferential surface of the shaft 4 is set to be as small as possible. Therefore, a difference arises between the flow speeds of air current generated during rotation of the motor 1 in the axial gap defined between the axially outward faces of the thrust plates 4*a*, 4*b* and the top face 7*a*1 and bottom face 7*b*1 of the counter-plates 7*a*, 7*b*, and of air current in the radial gap defined between the outer circumferential surface of the shaft 4 and the inner circumferential surfaces of the apertures 7*a*2, 7*b*2. This consequently makes greater the resistance to outflow to the motor 1 exterior of vapor (oil mist) that has arisen due to the lubricant 8 gasifying, and keeps pressure in the vicinity of the lubricant 8 interfaces high, which therefore prevents further vaporization of the lubricant 8. Also, applying an oil repellent made from for example a fluoric material onto each of these faces, prevents the lubricant 8 from leaking to the exterior of the motor 1 when at a standstill wherein centrifugal force does not act on the lubricant 8. This is in addition to the effect of the seals described above. The lubricant 8 might otherwise leak through the radial gap between the inner circumferential surfaces 7*a*2, 7*b*2 of the upper and lower counter-plates 7*a*, 7*b* and the outer circumferential surface of the shaft 4 due to the oil migration phenomenon when the motor 1 is at a standstill.

Further, because employing the spiral grooves 14 enables the outside diameter of the thrust plates 4*a*, 4*b* to be made diametrically smaller, the thrust plate configuration is abbreviated and the number of manufacturing steps is reduced, which contributes to motor cost reduction. At the same time the peripheral speed of the thrust plates 4*a*, 4*b* during rotation of the motor is lessened, and bearing damage that is due to viscous resistance of the lubricant 8 is restrained, which elevates the electrical efficiency of the motor and curbs its power consumption.

In addition, by enabling the thrust plates 4*a*, 4*b* to be made diametrically smaller, sufficient space can be secured for the magnetic circuit consisting of the rotor magnet 10 and the stator 12, even wherein the magnetic circuit is positioned in the vicinity of the lower thrust dynamic-pressure bearing portion 18. High drive torque can therefore be attained.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A motor comprising:

a shaft;

a pair of disk-shaped thrust plates attached proximate either end of said shaft, said pair of thrust plates therein having mutually opposing axially inward faces;

a sleeve having a radially inner peripheral surface opposing said shaft on its outer circumferential surface via radial micro-gaps, thrust faces opposing the axially inward faces of said pair of thrust plates via thrust micro-gaps, and inner peripheral surfaces radially opposing outer circumferential surfaces of said pair of thrust plates via gaps therewith;

a pair of thrust dynamic-pressure bearing portions formed retaining a lubricant within said thrust micro-gaps, being defined in between the axially inward faces of said pair of thrust plates and the thrust faces of said sleeve by which they are axially opposed, wherein the lubricant retained in said thrust micro-gaps fronts on air within the gaps defined in between said thrust plate outer circumferential surfaces and said sleeve inner peripheral surfaces;

a pair of radial dynamic-pressure bearing portions adjoining the pair of thrust dynamic-pressure bearing portions, wherein lubricant is retained, continuously with lubricant retained in said thrust dynamic-pressure bearing portions, within said micro-gap defined in between the outer circumferential surface of said shaft and the radially inner peripheral surface of said sleeve, wherein an annular gas intervention retaining air is provided approximately midway of said radial micro-gaps, meanwhile lubricant retained respectively in said pair of radial dynamic-pressure bearing portions fronts on air retained in the gas intervention, and the pairs of thrust dynamic-pressure bearing portions and radial dynamic-pressure bearing portions continuously retaining said lubricant are respectively configured as a first dynamic-pressure bearing section and a second dynamic-pressure bearing sections meanwhile all edges of the lubricant retained in the dynamic-pressure bearing sections form meniscuses due to balancing of surface tension of and intermolecular forces in said lubricant, and air pressure and surface energy of components the edges of the lubricant contact; and at least one communicating axial pathway formed in said sleeve, said axial pathway axially inter-penetrating said thrust faces configuring said pair of thrust dynamic-pressure bearing portions, wherein lubricant is retained continuously in said pair of thrust dynamic-pressure bearing portions, wherein lubricant shifts mutually through said communicating pathway between said first dynamic-pressure bearing section and second dynamic-pressure bearing section so as to make radii of curvature of the meniscuses formed at the edges of the lubricant retained in the dynamic-pressure bearing sections equal.

2. The motor set forth in claim 1, wherein:

spiral-shaped grooves of conformation for pressuring the lubricant radially as a dynamic pressure-generating means are formed in said thrust dynamic-pressure bearing portions; and herringbone grooves of axially asymmetrical conformation as a dynamic pressure-generating means so as to pressure-send lubricant in the direction of the thrust dynamic-pressure bearing portions are formed in said radial dynamic-pressure bearing portions.

3. The motor set forth in claim 1, wherein a breathing hole opening on said gas intervention is formed in said shaft, for the gas intervention to be communicated with the motor exterior.

4. The motor set forth in claim 3, wherein:

said breathing hole opens in an axial mid-portion of said gas intervention; and said gas intervention is formed such that radial dimension of the gap defined in between the shaft outer circumferential surface and the sleeve radially inner peripheral surface expands from respective tapers at either edge of the gas intervention proximate said pair of radial bearing portions, toward where said breathing hole opens.

5. The motor set forth in claim 1, wherein radial dimension of the gaps defined in between the outer circumferential surfaces of said pair of thrust plates and said sleeve inner peripheral surfaces is formed so as to expand heading axially outward from a taper.

6. The motor set forth in claim 1, characterized by a pair of counter-plates arranged on axially outward sides of said pair of thrust plates, and formed with round apertures centrally through which said shaft is inserted with play via a micro-gap and having thrust outer faces opposing said pair of thrust plates at intervals therefrom via gaps axial dimensions of which expand heading radially inward; wherein during rotation of the motor, meniscuses in lubricant retained in said pair of thrust dynamic-pressure bearing portions ate present within the gaps defined in between the thrust plates and the counter-plates.

7. The motor set forth in claim 1, wherein said communicating pathway is formed so as to open among said thrust faces adjacent outer peripheral ends of said pair of thrust dynamic-pressure bearing portions.

8. The motor set forth in claim 7, wherein:

said sleeve is configured from a cylindrical inner-tubular section formed with an outer circumferential surface axial cut-out and having said thrust faces and said radially inner peripheral surface, and an outer-tubular section provided with a cylindrical inner peripheral surface to which the inner-tubular section outer circumferential surface is conformed to fit; and said communicating pathway is defined by the axial cutout and the cylindrical inner peripheral surface.

* * * * *